United States Patent
Li et al.

(10) Patent No.: US 11,968,574 B2
(45) Date of Patent: Apr. 23, 2024

(54) 5G NEW RADIO (NR) NETWORK CONTROLLED SMALL GAP (NCSG)

(71) Applicant: APPLE INC., Cupertino, CA (US)

(72) Inventors: Qiming Li, Beijing (CN); Dawei Zhang, Cupertino, CA (US); Huaning Niu, Cupertino, CA (US); Jie Cui, Cupertino, CA (US); Manasa Raghavan, Cupertino, CA (US); Yang Tang, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 439 days.

(21) Appl. No.: 17/593,519

(22) PCT Filed: Jan. 14, 2021

(86) PCT No.: PCT/CN2021/071734
§ 371 (c)(1),
(2) Date: Sep. 20, 2021

(87) PCT Pub. No.: WO2022/151144
PCT Pub. Date: Jul. 21, 2022

(65) Prior Publication Data
US 2023/0180080 A1    Jun. 8, 2023

(51) Int. Cl.
*H04W 8/22* (2009.01)
*H04W 36/00* (2009.01)
(52) U.S. Cl.
CPC ......... *H04W 36/0088* (2013.01); *H04W 8/22* (2013.01)

(58) Field of Classification Search
CPC ...... H04W 36/0088; H04W 8/22; H04W 8/24
See application file for complete search history.

(56) References Cited

U.S. PATENT DOCUMENTS

2012/0307670 A1\* 12/2012 Kazmi ................ H04W 24/10
370/252
2015/0215837 A1\* 7/2015 Yiu ...................... H04W 24/10
370/332

(Continued)

FOREIGN PATENT DOCUMENTS

CN        108366379 A       8/2018
CN        110603838 A      12/2019

OTHER PUBLICATIONS

Nokia, Alcatel-Lucent Shanghai Bell, "Measurement gap Enhancements", R2-166230, 3GPP TSG-RAN WG2 Meeting #95bis, Kaohsiung, Taiwan, Agenda Item 8.15, Oct. 10-14, 2016, 5 pages.

(Continued)

*Primary Examiner* — Syed Ali
(74) *Attorney, Agent, or Firm* — Dorsey & Whitney LLP

(57) ABSTRACT

A UE for a 5G system is to perform a measurement during a network controlled small gap (NCSG). The NCSG includes a first visible interruption length (VIL1), a measurement length (ML), a second visible interruption length (VIL2), and a visible interruption repetition period (VIRP). A UE capability indicates a length of one or both the VIL1 and the VIL2. NCSG pattern information provides the NCSG for the UE, in which the VIL1 and the VIL2 indicate when the UE is not expected to transmit and receive data on a serving carrier, the ML indicates when the UE is expected to transmit and receive data on the serving carrier, and the VIRP indicates a period in which to repeat the NCSG.

18 Claims, 12 Drawing Sheets

(56) References Cited

U.S. PATENT DOCUMENTS

| | | | | |
|---|---|---|---|---|
| 2015/0327104 | A1* | 11/2015 | Yiu | H04W 36/0069 |
| | | | | 455/450 |
| 2016/0295583 | A1* | 10/2016 | Kazmi | H04W 36/0088 |
| 2018/0083748 | A1* | 3/2018 | Tang | H04L 5/0032 |
| 2020/0084677 | A1 | 3/2020 | Yiu et al. | |
| 2020/0374723 | A1* | 11/2020 | Zheng | H04W 24/00 |
| 2021/0014751 | A1* | 1/2021 | Callender | H04W 72/0446 |
| 2021/0410024 | A1* | 12/2021 | Tang | H04W 36/0088 |
| 2023/0171592 | A1* | 6/2023 | Han | H04W 8/26 |
| | | | | 370/328 |
| 2024/0015609 | A1* | 1/2024 | Hong | H04W 36/0058 |

OTHER PUBLICATIONS

PCT/CN2021/071734, International Search Report and Written Opinion, dated Sep. 28, 2021, 9 pages.

* cited by examiner

5G NEW RADIO (NR) NETWORK CONTROLLED SMALL GAP (NCSG)

TECHNICAL FIELD

This application relates generally to wireless communication systems, including NCSG.

BACKGROUND

Wireless cellular telecommunication networks include Radio Access Networks (RANs) that enable User Equipment (UE), such as smartphones, tablet computers, laptop computers, etc., to connect to a core network. In a cellular network, UEs typically communicate with base stations using radio channels corresponding to a licensed spectrum of radio frequencies.

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node. NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
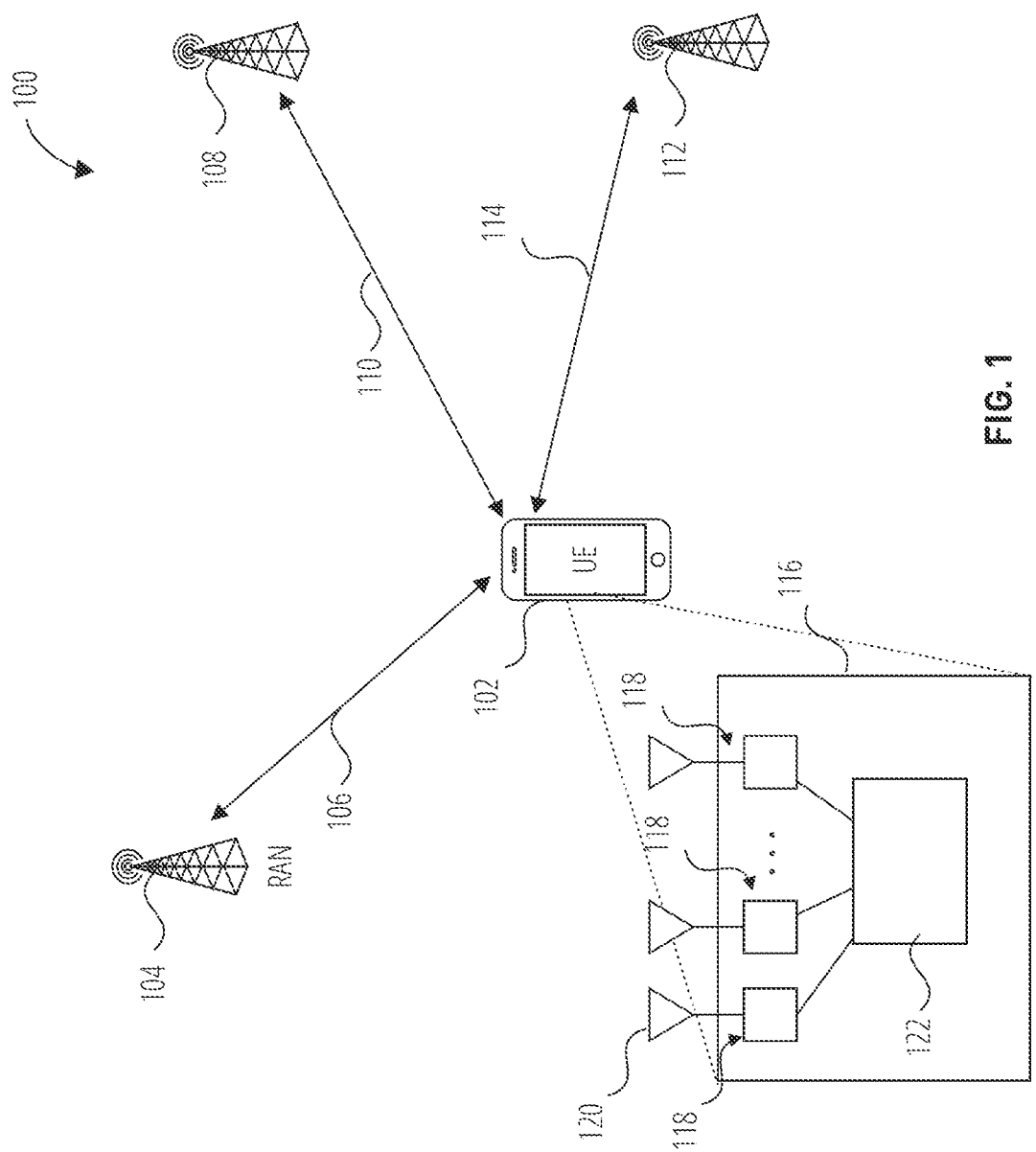
FIG. 1 is block diagram of a UE in a 5G network, showing in a detail view RF chains of the UE.

UEs may measure the received power (signal quality) of the serving cell (i.e., the cell to which the UE is attached) and/or neighboring cells, and may report the measured values, in a measurement report, to the base station associated with the cell. In NR, the cell quality is measured by using Synchronization Signal Blocks (SSBs) in an SSB-based Radio Resource Management (RRM) Measurement Timing Configuration (SMTC) window. Additional details of NR measurements are shown and described in Y. Sano, et al., "5G Radio Performance and Radio Resource Management Specifications," NTT DOCOMO Technical Journal Vol. 20, No. 3 (January 2019). In particular, FIG. 7 of Sano et al. shows SSB and SMTC configuration examples. RRM measurement may include Reference Signal Received Power (RSRP), Reference Signal Received Quality (RSRQ), Received Signal Strength Indicator (RSSI), Reference Signal Time Difference (RSTD), or other measurements.

Sano, et al. also describes previous attempts at developing measurement gaps to streamline hardware by using the same RF transceiver (also referred to as an RF chain) for both (1) transmitting/receiving data in the serving cell and (2) measuring neighbor-cell quality or other component carriers (CCs). (In carrier aggregation (CA), each aggregated carrier is referred to as a CC.) Thus, a gap is scheduled at the serving cell in which the UE does not receive or transmit anything. During the gap, the UE may switch the carrier frequency to that of the target cell, perform the signal quality measurements, and then switch back to the frequency of the serving cell. For example, FIG. 8 of Sano, et al. shows an example attempt at measurement gap configuration in NR, which implements configurable Measurement Gap Lengths (MGLs) and Measurement Gap Repetition Periods (MGRP) according to NR measurement gap patterns (26 total) specified in 3GPP TS 38.133 (Rel-15). In LTE systems, the MGL is fixed.

As described in 3GPP TS 36.133 (Rel-16), short measurement gaps scheduled by the network are referred to as Network Controlled Small Gaps (NCSGs). NCSGs may be used by a cellular network to, for example, enhance the signal measurement processes by which a UE performs inter-frequency measurements. NCSG are intended to allow a UE to measure and do data transmission (or reception) in the time of a conventional MGL, which is based on the assumption that the UE may use some additional RF chain to conduct the measurement on the target frequency layer such that the UE can use a different RF chain for the data transmission/reception with the service cell.

A 3GPP Release 17 measurement gap enhancement work item was approved in RANP #89e (RP-202119). An objective of the work item is to enhance aspects of the NCSG specification developed by RAN work group four (RAN4) and RAN work group two (RAN2). Specifically, the work item calls for the following RRM requirements for NCSG (i.e., RAN4 work items): requirements for Visible Interruption Length (VIL) for different numerologies in FR1 and FR2; specification of NCSG patterns, Measurement Length (ML), and Visible Interruption Repetition Period (VIRP); requirements for DL reception and UL transmission during ML, before start VIL and after end VIL; and measurement requirements with NCSG. Additionally, the work item calls for specification of applicability of NCSG patterns (i.e., RAN4 work items) and procedures and signaling for NCSG patterns (i.e., a RAN2 work item). Thus, certain additional details for NCSG design in Release 17 NR are described in this disclosure.

FIG. 1 shows a network 100 having a user equipment UE 102 capable of measuring signal levels on one or more frequencies in designated measurement gaps in accordance with one or more embodiments. Network 100 may comprise a wireless wide area network (WWAN) operating in accordance with a Fifth Generation (5G) New Radio (NR) standards, although the scope of the claimed subject matter is not limited in this respect.

UE 102 is illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

UE 102 may be configured to connect, for example, communicatively couple, with an access node or radio access node (RAN). RAN may be an NG RAN and include a gNB 104. In network 100, UE 102 may be communicatively coupled via a radio link 106 with a serving cell embodied as gNB 104, which may also function as a primary cell (PCell) in some scenarios such as dual connectivity. UE 102 utilize connections (or channels) (e.g., radio link 106), each of which comprises a physical communications interface or layer. In this example, radio link 106 implements a NR protocol.

A RAN can include one or more AN nodes, such as a gNB 108 that enables a radio link 110 and a gNB 112 that enables a radio link 114. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system (e.g., an eNB). According to various embodiments, the RAN nodes may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

During measurement gaps designated by gNB 104, UE 102 will measure downlink (DL) frequency or frequencies of one or neighbor or target cells deployed on neighbor gNB 108 via radio link 110, which may function as a primary secondary cell (PSCell) in some scenarios. In addition, there may be one or more secondary cells such as secondary cell (SCell) or gNB 112 on which UE 102 may obtain DL measurements via radio link 114 during a designated measurement gap period. During the measurement gap period, UE 102 may measure RSRP and then provide a measurement report to gNB 104.

Measurement gap configurations may be specified and signaled via dedicated signaling for UE 102 such that no downlink or uplink scheduling between UE 102 and gNB 104 occurs to allow the UE to perform measurements on the one or more given frequencies. In some embodiments, the neighbor cell or gNB 108 may comprise a small cell or remote radio head (RRH) coupled to gNB 104 of the serving cell. In such embodiments, the neighbor cell or gNB 108 may comprise a micro cell, a pico cell, a femto cell, and so on. In other embodiments, neighbor cell or gNB 108 may comprise or otherwise be connected with a different eNB than the serving cell or gNB 104. The measurement results obtained by UE 102 for the one or more neighbors cells of gNB 108 or gNB 112 allow gNB 104 to determine whether to handover UE 102 to a new cell or eNB, for example if the signal levels with a neighboring cell are better than the signal levels for the serving cell of gNBs 104.

The measurement gap configuration is provided by network 100 to UE 102 via the serving cell or gNB 104. In accordance with one or more embodiments, UE 102 may indicate to network 100 the radio-frequency (RF) capability and the band capability of UE 102 so that network 100 can configure cell-group specific measurement for carrier aggregation or dual connectivity to reduce measurement delay and/or increase the downlink date rate if UE 102 has two or more RF chains and is capable of operating on multiple frequency bands for the two or more RF chains. For example, FIG. 1 shows a detail view of circuitry 116 of UE 102 including multiple RF chains 118 operating on multiple frequency bands. RF chains 118 may be coupled to multiple antennas, such as antenna 120, and RF chains 118 may be controlled by a processor 122. In another embodiment, one or more of the RF chains may be capable of operating on one or more frequency bands to transmit and/or receive data in the uplink (UL) and/or the downlink.

In this example, since UE 102 has more than one RF chain, UE 102 is capable of using both RF chains for gap measurements to reduce measurement delay and/or to increase spectrum efficiency. In other words, some UEs, such as UEs that have multiple radio circuits or radio chains, may thus be capable of concurrently communicating on multiple frequency bands, in which case a conventional measurement gap may not be needed. However, even though a UE with multiple radios may not require measurement gaps to perform measurements, communication gaps may still be used or needed in certain situations, such as to perform RF tuning in the physical layer. These short gaps may be scheduled by the network and may be referred to as NCSGs. In furtherance of using a NCSG, UE 102 may indicate is measurement gap capability to network 100, and network 100 may configure UE 102 to utilize a selected NCSG pattern, as shown in and described with respect to FIG. 2.

Figure 2:
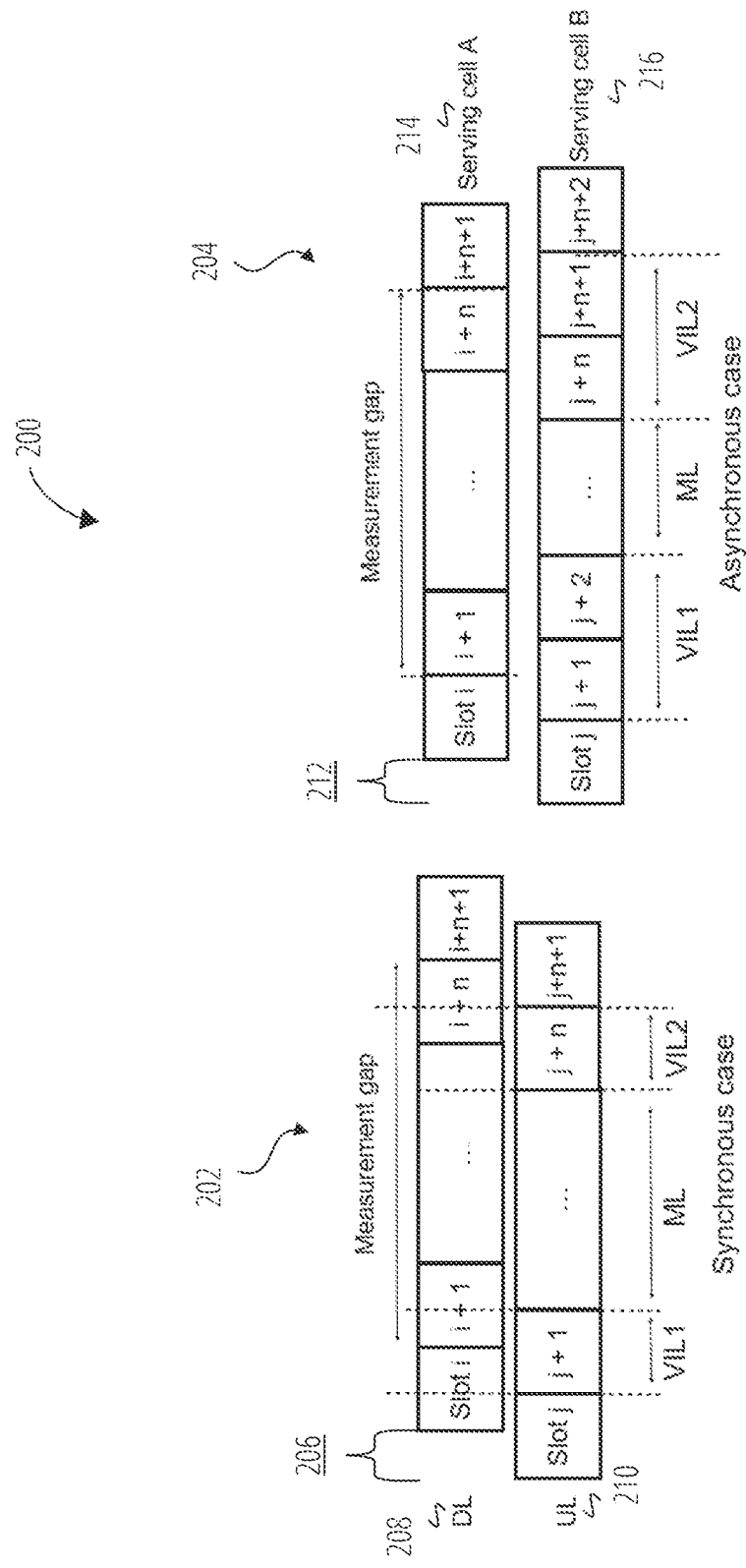
FIG. 2 is a pair of slot diagrams for synchronous and asynchronous cases, showing features of an NCSG.

FIG. 2 shows two general designs for NCSG patterns 200, which include a synchronous case 202 and an asynchronous case 204. In synchronous case 202, a propagation delay 206 is shown as a timing offset between a DL timing 208 and UL timing 210. In asynchronous case 204, a delay 212 is also shown because serving cell A timing 214 and serving cell B timing 216 are maintained separately from each other.

Each NCSG pattern consists of four components: VIL1, ML, VIL2, and VIRP. VIL1 is the visible interruption length before measurement. VIL1 is provided due to the fact that UE needs time to configure the additional RF chain for measurement. During VIL1, the UE is not expected to transmit or receive any data on corresponding serving cells. ML is the measurement length. During ML, the UE is expected to transmit and receive data on the corresponding serving carrier. VIL2 is the visible interruption length after measurement. VIL2 is provided due to the fact that the UE needs to switching off the spare RF chain after measurement. During VIL2, the UE is not expected to transmit or receive any date on corresponding serving cells. VIRP is the visible interruption repetition period.

In one embodiment, NCSG can be configured per UE. For example, each CC has the same NCSG configuration applied to the CC.

Figure 3:
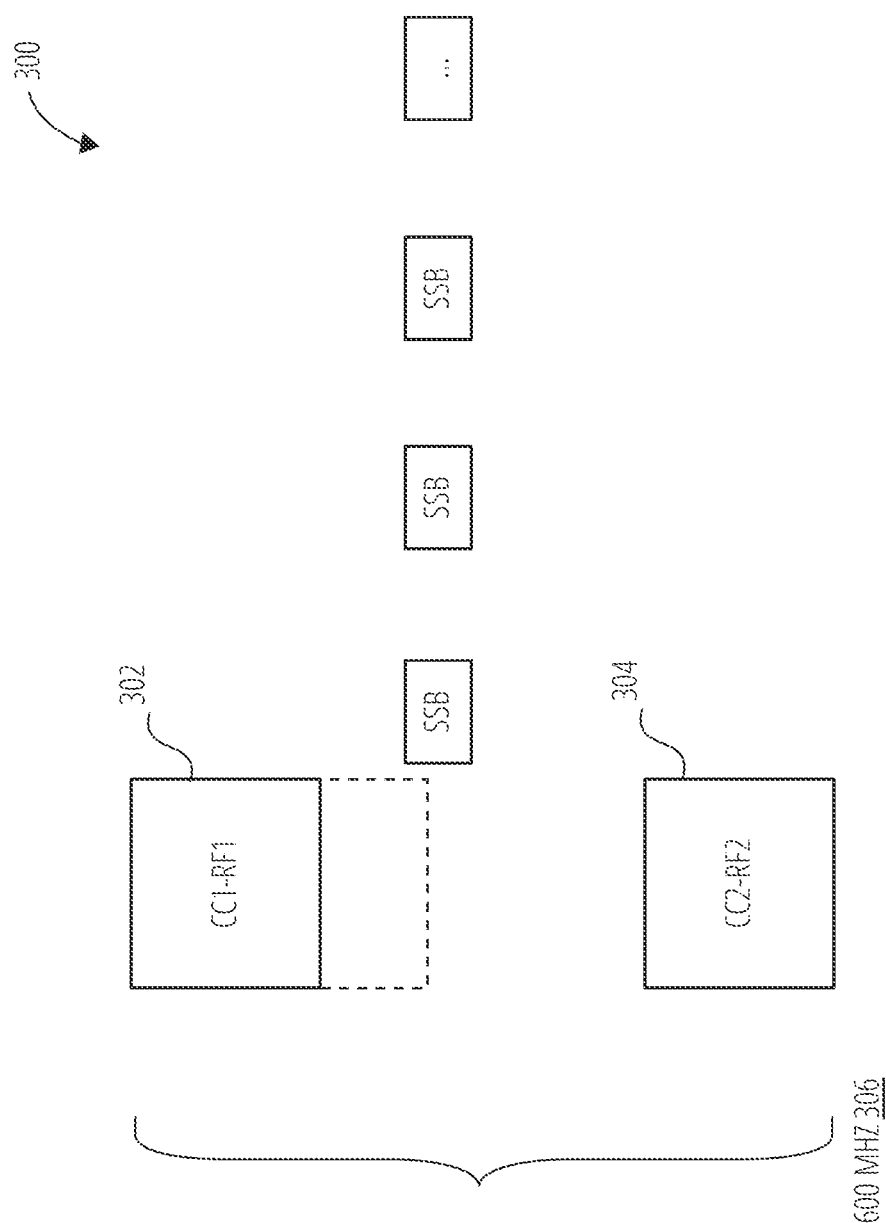
FIG. 3 is a bandwidth diagram showing NCSG configured on a component carrier.

In other embodiments, NCSG can be configured per carrier, as shown in a bandwidth timing diagram 300 of FIG. 3. In the example bandwidth timing diagram 300, a UE (not shown) is configured with two CCs, including a CC1-RF1 302 and a CC2-RF2 304. A CC may have a bandwidth of 1.4, 3, 5, 10, 15 or 20 MHz and a maximum of five CCs can be aggregated, and therefore, a maximum aggregated bandwidth is 100 MHz. In frequency division duplexing (FDD) systems, the number of aggregated carriers can be different for DL and UL, where the number of UL CCs is equal to or lower than the number of DL CCs. In some cases, individual CCs can have a different bandwidth than other CCs. In TDD systems, the number of CCs as well as the bandwidths of each CC is usually the same for DL and UL.

Since CC1-RF1 302 and CC2-RF2s 304 are displaced from each other in terms of a 600 MHz bandwidth 306, they are allocated to separate RF chains, where "RF1" corresponds to a first RF chain and "RF2" corresponds to a second RF chain. The first RF chain is configured to handle the data for the first CC. The second RF chain is configured to handle the data for the second CC. Each may include a different NCSG configuration.

If a measurement object is configured for the UE to measure a block outside the CC bandwidth, e.g., outside CC1-RF1 302, there are two options as follows. One option is that the UE can enlarge the bandwidth of CC1-RF1 302 to cover the target access block, as shown in broken lines. This option depends on how close the target access block is away from CC1-RF1 302 in terms of bandwidth such that CC1-RF1 302 can cover the target access block. Also, in this option, there may not be any impact on CC2-RF2 304.

The other option is that the LE can enable another RF chain, e.g., a third RF chain, to cover the target access block.

Figure 4:
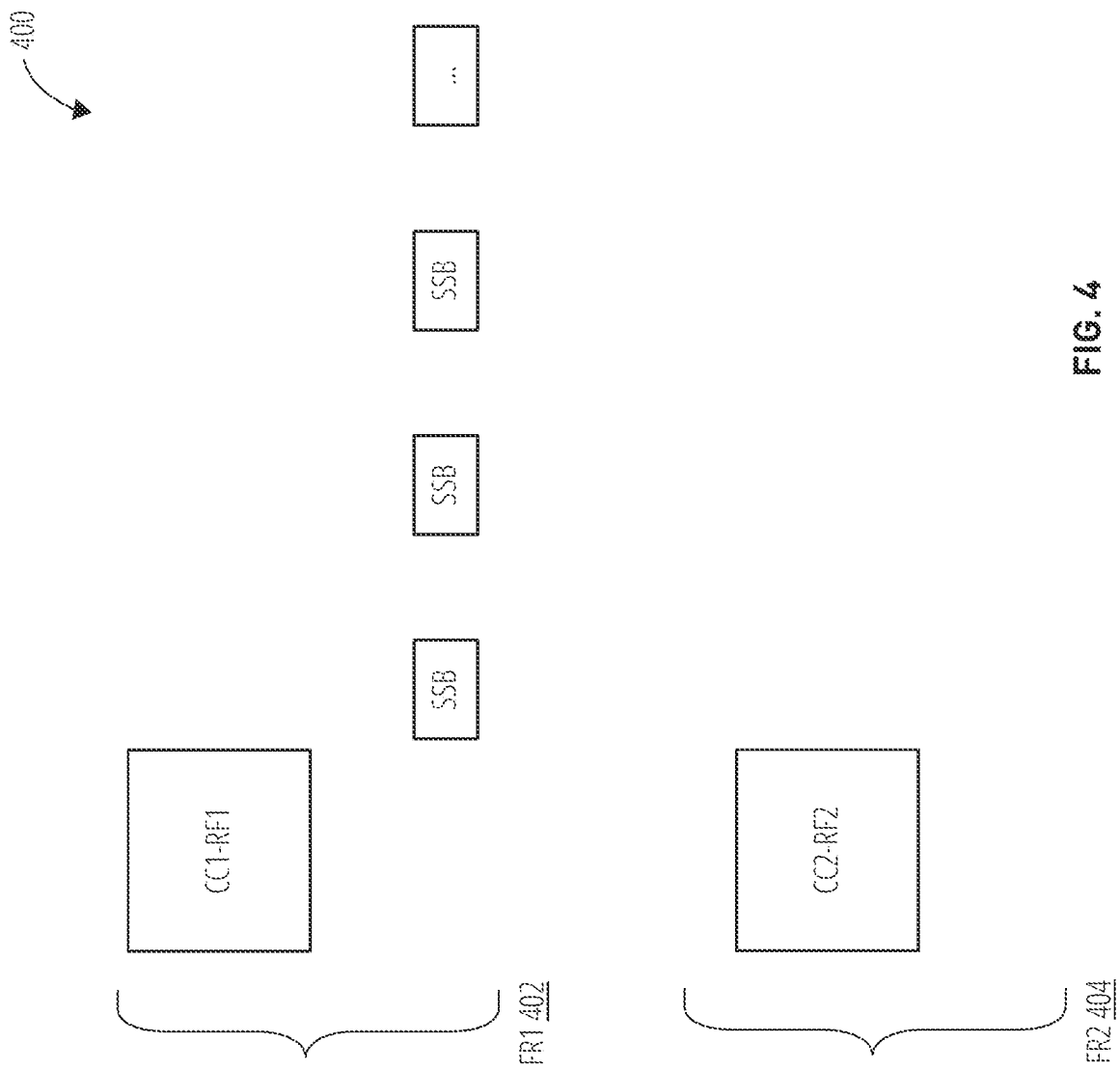
FIG. 4 is a bandwidth diagram showing NCSG configured on a frequency range.

FIG. 4 shows another embodiment of a bandwidth timing diagram 400 in which NCSG is configured per frequency range. For example, 5G NR may include two different frequency ranges, labeled FR1 402 and FR2 404. Frequency Range 1 may include frequency bands operating in sub-6 GHz frequencies, some of which are bands that may be used by previous standards and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region. In some embodiments, a UE may include a separate baseband module for each frequency range. For that type of UE, operation on one baseband will not impact operation on the other one.

Figure 5:
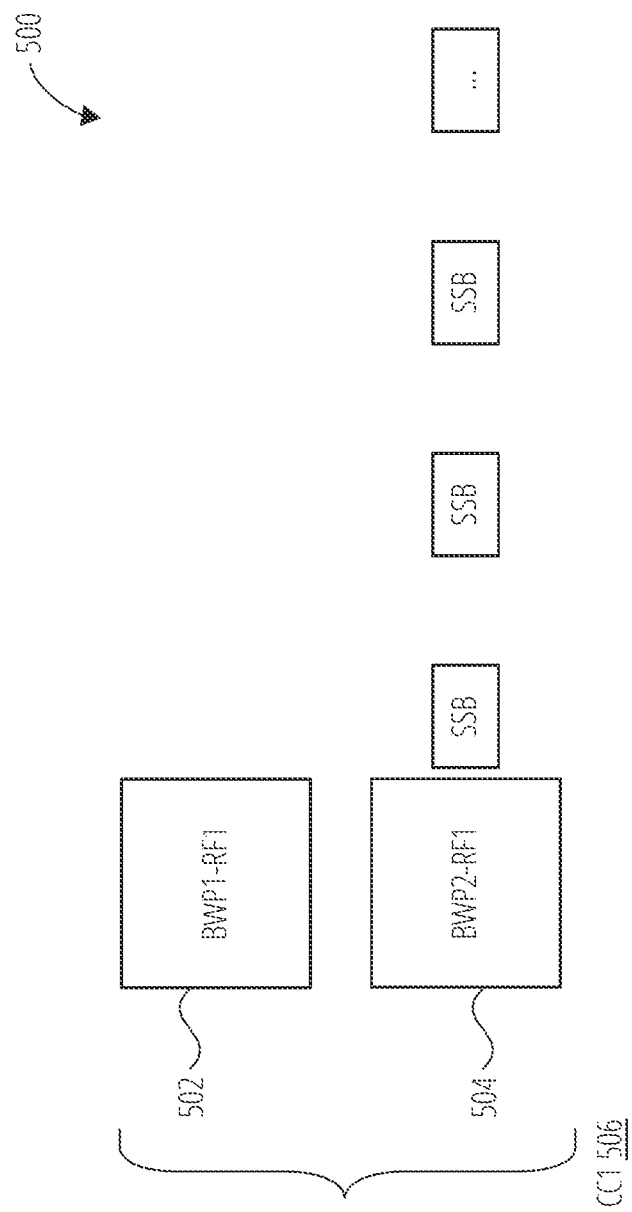
FIG. 5 is a bandwidth diagram showing NCSG configured on a bandwidth part.

FIG. 5 shows another embodiment of a bandwidth timing diagram 500 in which NCSG is configured per bandwidth part (BWP). In the example bandwidth timing diagram 500, a UE (not shown) is configured with two BWPs, including a BWP1-RF1 502 and a BWP2-RF1 504, which are allocated to the same RF chain. A UE can be configured with up to four different BWPs per CC. Accordingly, FIG. 5 shows an example in which BWP1-RF1 502 and BWP2-RF1 504 are both allocated to a CC1 506. When a UE is working on BWP1-RF1 502, the UE may use an NCSG to measure the target SSB by enlarging BWP1-RF1 502 in the frequency domain. Another option is to activate another RF chain.

In other embodiments, NCSG may be configured per band or per band combination. Per band means a UE can report different a VIL2 length (or VIL1 length, ML length, etc.) on different band, e.g. 0.5 ms on band 1 and 0.2 ms on band 2. Per band-combination means a UE can report different VIL2 length (or VIL1 length, ML length, etc.) on different band combination, e.g. 0.5 ms when UE is working on Band 0+1 CA or DC, and 0.2 ms when UE is working on Band 2+3 CA or DC.

Figure 6:
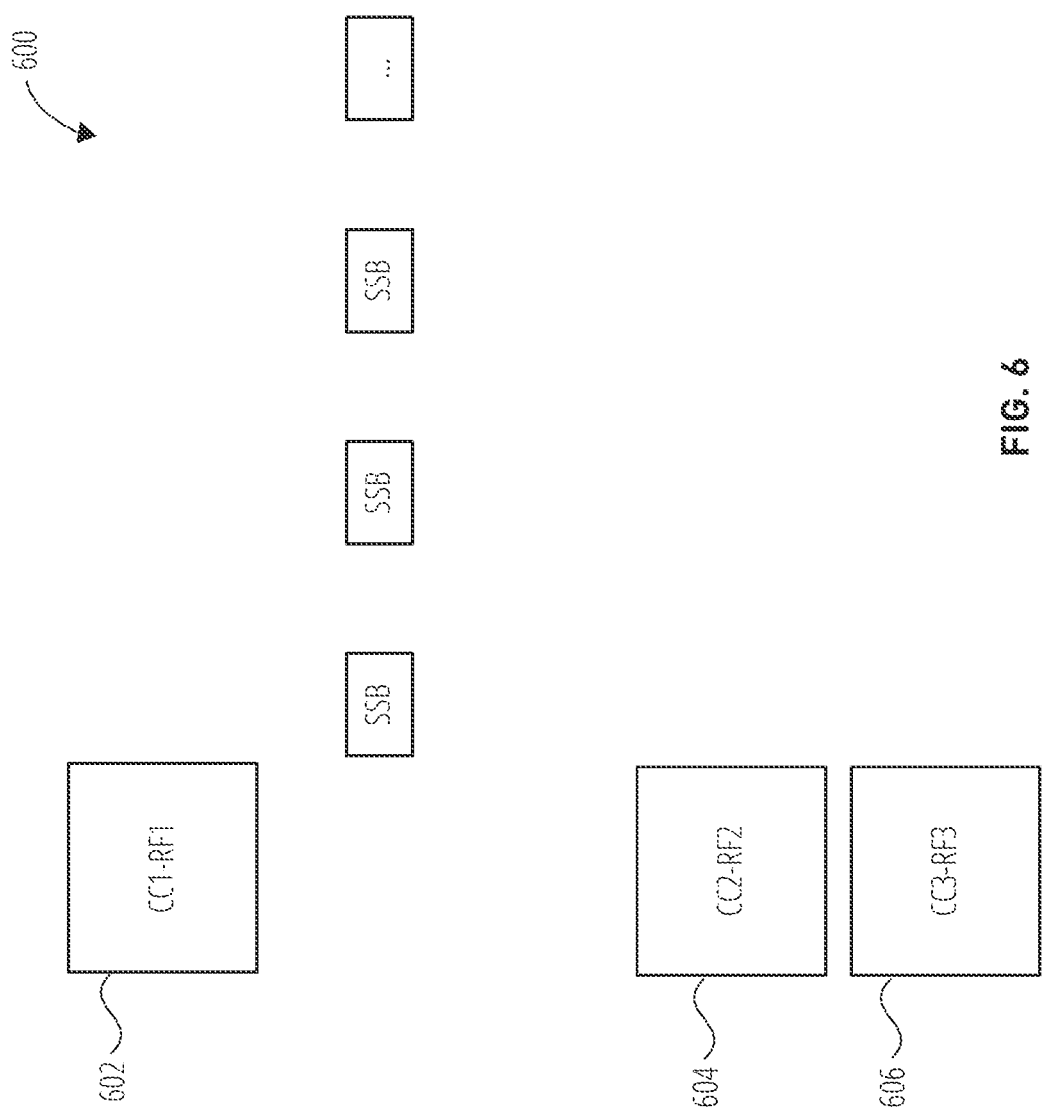
FIG. 6 is a bandwidth diagram showing NCSG configurable per feature set.

In yet another embodiment, NCSG is also configurable per feature set. As described in 3GPP TS 38.306, a fallback band combination is a band combination that would result from another band combination by releasing at least one SCell or uplink configuration of SCell, or SCG. An intra-band non-contiguous band combination is not considered to be a fallback band combination of an intra-band contiguous band combination. A fallback per band feature set is feature set per band that has same or lower values than the reported values from the reported feature set per band for a given band. A fallback per CC feature set is a feature set per CC that has lower value of UE supported MIMO layers and BW while keeping the numerology and other parameters the same from the reported feature set per CC for a given carrier per band. For example, FIG. 6 shows a bandwidth timing diagram 600 including a CC1-RF1 602, a CC2-RF2 604, and a CC3-RF3 606. There is no spare RF chain to perform a measurement. Accordingly, the UE can fallback to a per-UE measurement gap operation so that the measurement gap applies to all the CCs.

Finally, NCSG may be configured as any combination of the above-described embodiments: per carrier; per UE; per frequency range; per BWP; per band or per band combination; or per feature set (TS38.306) (per band or per band combination).

This disclosure also describes embodiments relating to NCSG configuration applicability. A first option is that NCSG can be configured on the carrier (or BWP) on which there is not any other configured measurement gap. For instance, if a UE does not support per-FR gap or per-CC gap, then NCSG can only be configured when there is not any other configured measurement gap, unless UE can support parallel measurement gap patterns.

Per-FR gap means that a UE has a separate baseband module per each FR, so when the UE is doing a measurement on a target carrier in FR1, then FR2 need not have a gap. Data between the UE and base station is possible in FR2, for example. If a UE supports per-FR gap, then NCSG can only be configured in the frequency range in which there is not any other configured measurement gap, unless UE can support parallel measurement gap patterns.

Pre-CC gap means an NCSG is allowed on certain carriers (instead of all carriers in a frequency range). If a UE supports per-CC gap, then NCSG can only be configured on CCs on which there is not any other configured measurement gap, unless UE can support parallel measurement gap patterns.

Figure 7:
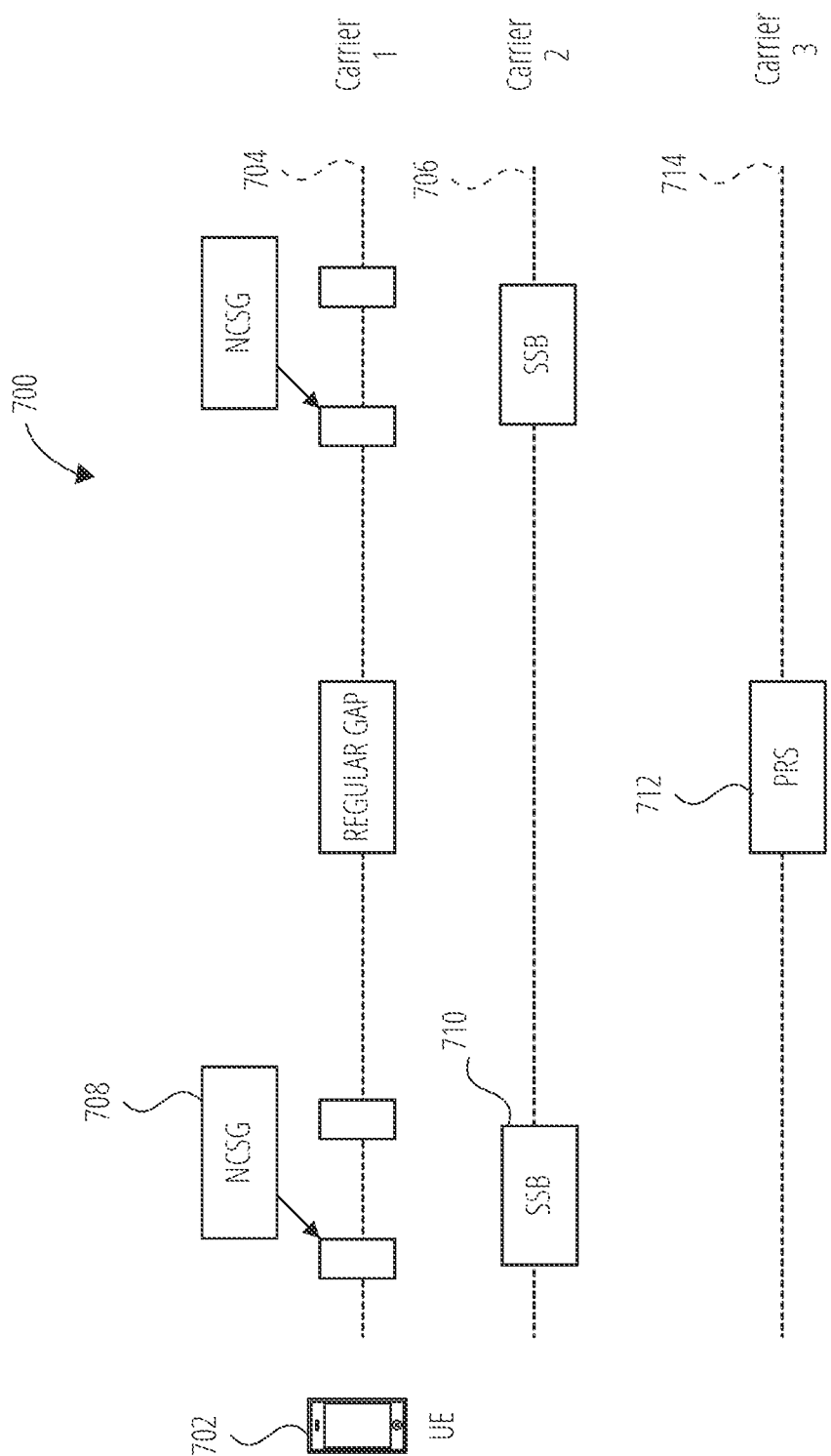
FIG. 7 is a diagram showing NCSG configured with a legacy measurement gap.

A second option is that NCSG can be configured together with other (i.e., legacy) measurement gaps. FIG. 7 shows an example diagram 700 in which a UE 702 is working on a first carrier 704. Since a second carrier 706 is close to first carrier 704 (i.e., close in terms of frequency domain), UE 702 can measure second carrier 706 by enlarging bandwidth of first carrier 704. Thus, an NCSG 708 in first carrier 704 is used for measuring an SSB 710 in second carrier 706. However, UE 702 is configured with a Positioning Reference Signals (PRS) PRS 712 measurement object on a third carrier 714. Since there is no spare RF chain, UE 702 includes a regular gap (non-NCSG) to measure target PRS 712.

In some embodiments, there are interruptions due to NCSG. During NCSG, a UE is allowed to cause an interruption during VIL1 and VIL2. Thus, the UE is not expected to transmit or receive data on the corresponding serving cells. Outside of these windows, however, a UE can transmit or receive data with a serving cell. The general design of the number of slots interrupted is summarized in the following paragraph, which is then followed by an example shown and described with reference to FIG. 8.

For DL, one additional slot interruption is allowed for both VIL1 and VIL2 in asynchronous cases. For UL, if VIL1=VIL2 in synchronous cases, then an additional slot interruption is allowed for both VIL1 and VIL2 in asynchronous cases; if VIL2=VIL1+1 slot in synchronous cases, then an additional slot interruption is allowed only for VIL1 in asynchronous cases. In other words, even in synchronous cases, VIL2 on uplink would have one more slot than VIL1, e.g., in 30 kHz. Thus, in asynchronous cases, there is additional slot in VIL1, but VIL2 would be the same.

Figure 8:
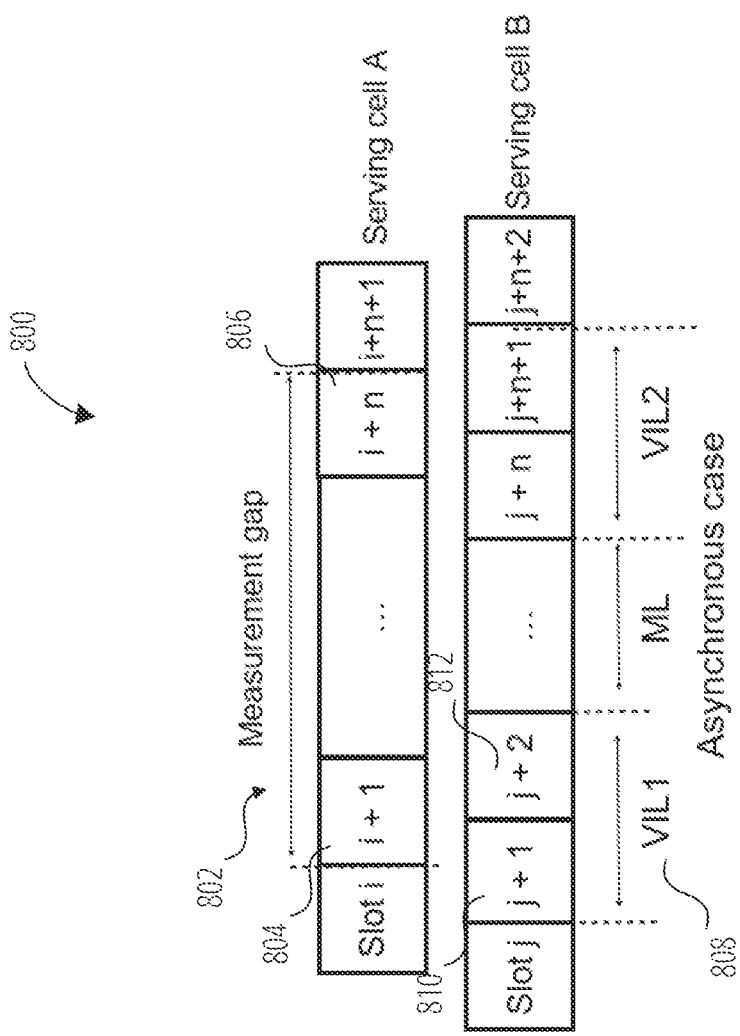
FIG. 8 is a slot diagram showing in greater detail a number of interrupted slots in an asynchronous case.

FIG. 8 shows that on asynchronous CCs, one more slot interruption in VIL1 are allowed. This is attributable to different timings alignment of the different CCs. Thus, in an example bandwidth timing diagram 800 of FIG. 8, if a measurement gap 802 is configured as shown from a first slot 804 labeled i+n to another slot 806 labeled i+n for service cell A, then a UE will perform the measurement in this measurement gap 802. Due to RF chain operation and timing differences, VIL1 808 occupies two slots of serving cell B such that a second slot 810 labeled j+1 and a third slot 812 labeled j+2 are interrupted. For synchronous case (not shown), there is no additional slot that is interrupted during VIL1.

FIG. 8 also shows that VIL2 interrupts two slots, although in some cases (noted above), an additional slot in not necessary for VIL2. For instance, in some UE implementations, the RF switching time could be 0.5 ms. And for 30 kHz cases, the 0.5 ms time corresponds to one slot. Considering timing advance, interruption on an additional slot on uplink should be allowed even in synchronous cases. Total interruption on uplink in synchronous cases would be two slots. Thus, even in asynchronous cases, the switching time (0.5 ms) at most covers two slots. The difference from synchronous cases is that in asynchronous cases there is more overlapping on the next second slot. And interruption on the whole slot is allowed. The total interruption would still be two slots in uplink in asynchronous case.

If a UE supports and has being configured with NCSG, during RRM measurement (RSRP/RSRQ/RSSI/RSTD, and etc.) on SCC, UE shall not make any autonomous interruptions outside of the configured gap patterns.

In terms of interruption applicability, there are two options. A first option depends on UE capability. If UE supports per-FR gap, then interruption due to NCSG is only allowed within the frequency range in which NCSG is configured. A second option depends on NCSG configuration. If NCSG is per-CC or per-band configured, then interruption due to NCSG is only allowed on the corresponding CCs and band.

The design of VIL1 includes options for the length of VIL1 and the minimum value for VIL1.

In terms of the length of VIL1, there are three options. A first option is that the length of VIL1 is defined as fixed value (such as 0.5 ms, 0.2 ms, or other fixed length), rounding up to number of slot according different numerologies. A second option is to introduce a new UE capability indicating a length of VIL1 (same or different capabilities for intra-band and inter-band). The new UE capability may be indicated per band or per band combination. A third option depends on UE capability of an information element (IE) called SRS-SwitchingTimeNR, which is indicated from UE to the network to signal how much time is used to perform RF tuning to another carrier. The SRS-SwitchingTimeNR signaling corresponds to a number of slots for VIL1.

In terms of the minimum value for VIL1, there are two options. A first option is to define in slot level, i.e., the minimum number of slots is one in both uplink and downlink. When there is partial overlap, the overlapped symbol is interrupted. A second option is to define in symbol level, i.e., the minimum number of symbols is one in both uplink and downlink. Accordingly, symbols in a slot that are not interrupted (e.g., a half slot interruption) could still be used to support transmission and reception.

The design of VIL2 also includes options for the length of VIL2 and the minimum value for VIL2. The design is similar to that of VIL1, but it includes one more symbol in the uplink as explained below.

In terms of the length of VIL2, there are three options. A first option is when VIL2 is defined as fixed value (such as 0.5 ms, 0.2 ms, and etc.), rounding up to a number of slots according different numerologies. A second option is to introduce a new UE capability indicating length of VIL2 (same or different capabilities for intra-band and inter-band). The new UE capability may be indicated per band or per band combination. A third option depends on UE capability of SRS-SwitchingTimeNR.

In terms of the minimum number of slots in VIL2, there are two options. A first option is to define VIL2 at a slot level. For instance, there may be one slot for DL and one slot for UL (for small timing advance). Alternatively, there may be one slot for DL and two slots for UL (if the timing advance exceeds CP length). A second option is to define VIL2 at a symbol level. For instance, the is one symbol for DL and 1+x symbols for UL, where x is determined by how much timing advance is greater than CP.

The design of ML includes two options. A first option for the total measurement gap length is to employ the same length of the existing measurement gap patterns. Therefore, ML=MGL−VIL1−VIL2, where MGL is defined in 3GPP TS 38.133, table 9.1.2-1 for different gap patterns. For example, for UE indicating VIL1=VIL2=1 ms, then the ML=4 ms. A second option is to introduce a new ML separately from MGL in existing MG patterns. For example, ML is specified at a slot level, e.g., ML=1 ms, 2 ms, . . . , 10 ms. Alternatively, ML is specified at a symbol level, e.g., ML=x symbols.

NR supports multiple NCSG patterns with different VIRP. A first option is to follow existing MGRP: 20 ms, 40 ms, 80 ms, and 160 ms for baseline support; and 320 ms, 640 ms, or larger for a UE supporting new positioning gap patterns. A second option is to introduce new VIRP separately from existing MGRP. Accordingly, VIRP can be flexibly configured, such as VIRP=1 ms, 2 ms, . . . 10 ms, and so forth.

Figure 9:
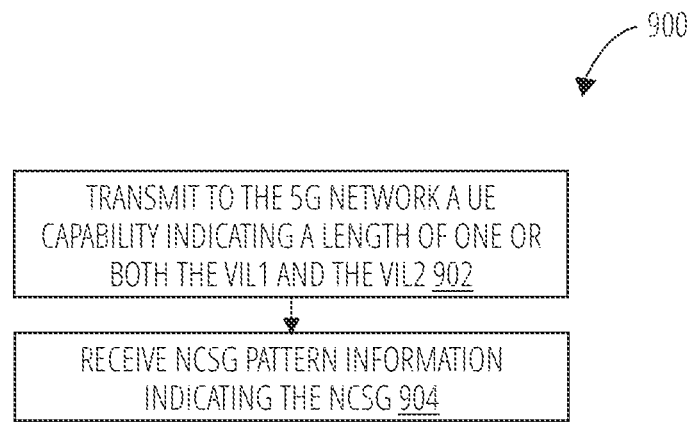
FIG. 9 is a flow diagram of a process for configuring NCSG.

FIG. 9 shows a process, performed by a user equipment (UE) for a 5G network, of configuring the UE to perform a measurement during an NCSG. In block 902, process 900 entails transmitting to the 5G network a UE capability indicating a length of one or both the VIL1 and the VIL2. For example, the length can be indicated in a Radio Resource Control (RRC) message as a UE capability such as SRS-SwitchingTimeNR.

In block 904, process 900 entails receiving NCSG pattern information indicating the NCSG. The VIL1 and the VIL2 indicate when the UE is not expected to transmit and receive data on a serving carrier, the ML indicates when the UE is expected to transmit and receive data on the serving carrier, and the VIRP indicates a period in which to repeat the NCSG.

Figure 10:
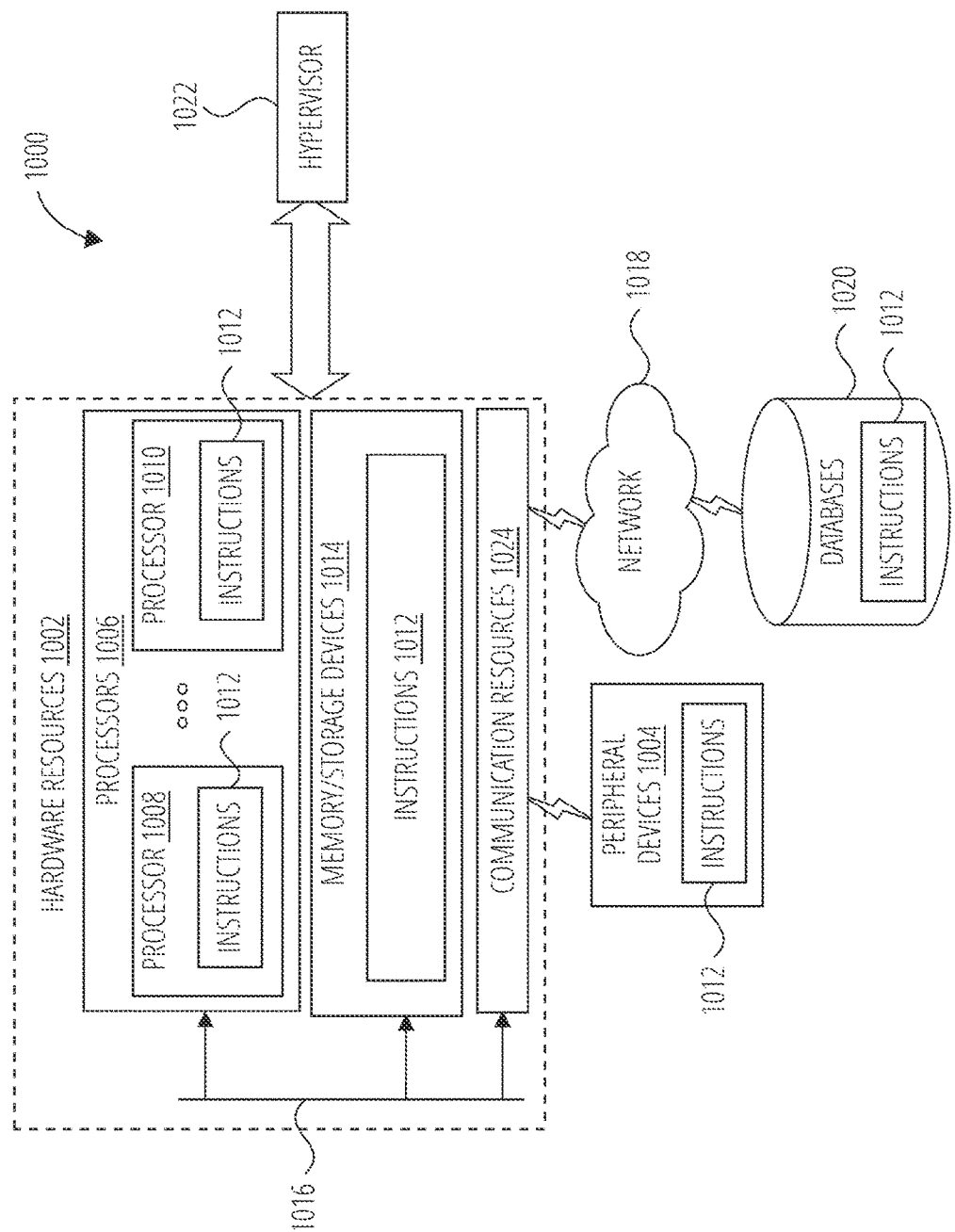
FIG. 10 is a block diagram of a computing device, according to one embodiment.

FIG. 10 is a block diagram illustrating components 1000, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1002 including one or more processors 1006 (or processor cores), one or more memory/storage devices 1014, and one or more communication resources 1024, each of which may be communicatively coupled via a bus 1016. For embodiments where node virtualization (e.g., NFV) is utilized, a hypervisor 1022 may be executed to provide an execution environment for one or more network slices/sub-slices to utilize the hardware resources 1002.

The processors 1006 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1008 and a processor 1010.

The memory/storage devices 1014 may include main memory, disk storage, or any suitable combination thereof. The memory/storage devices 1014 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1024 may include interconnection or network interface components or other suitable devices to communicate with one or more peripheral devices 1004 or one or more databases 1020 via a network 1018. For example, the communication resources 1024 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1012 may comprise software, a program, an application, an applet, an app, or other executable code for causing at least any of the processors 1006 to perform any one or more of the methodologies discussed herein. The instructions 1012 may reside, completely or partially, within at least one of the processors 1006 (e.g., within the processor's cache memory), the memory/storage devices 1014, or any suitable combination thereof. Furthermore, any portion of the instructions 1012 may be transferred to the hardware resources 1002 from any combination of the peripheral devices 1004 or the databases 1020. Accordingly, the memory of the processors 1006, the memory/storage devices 1014, the peripheral devices 1004, and the databases 1020 are examples of computer-readable and machine-readable media.

Figure 11:
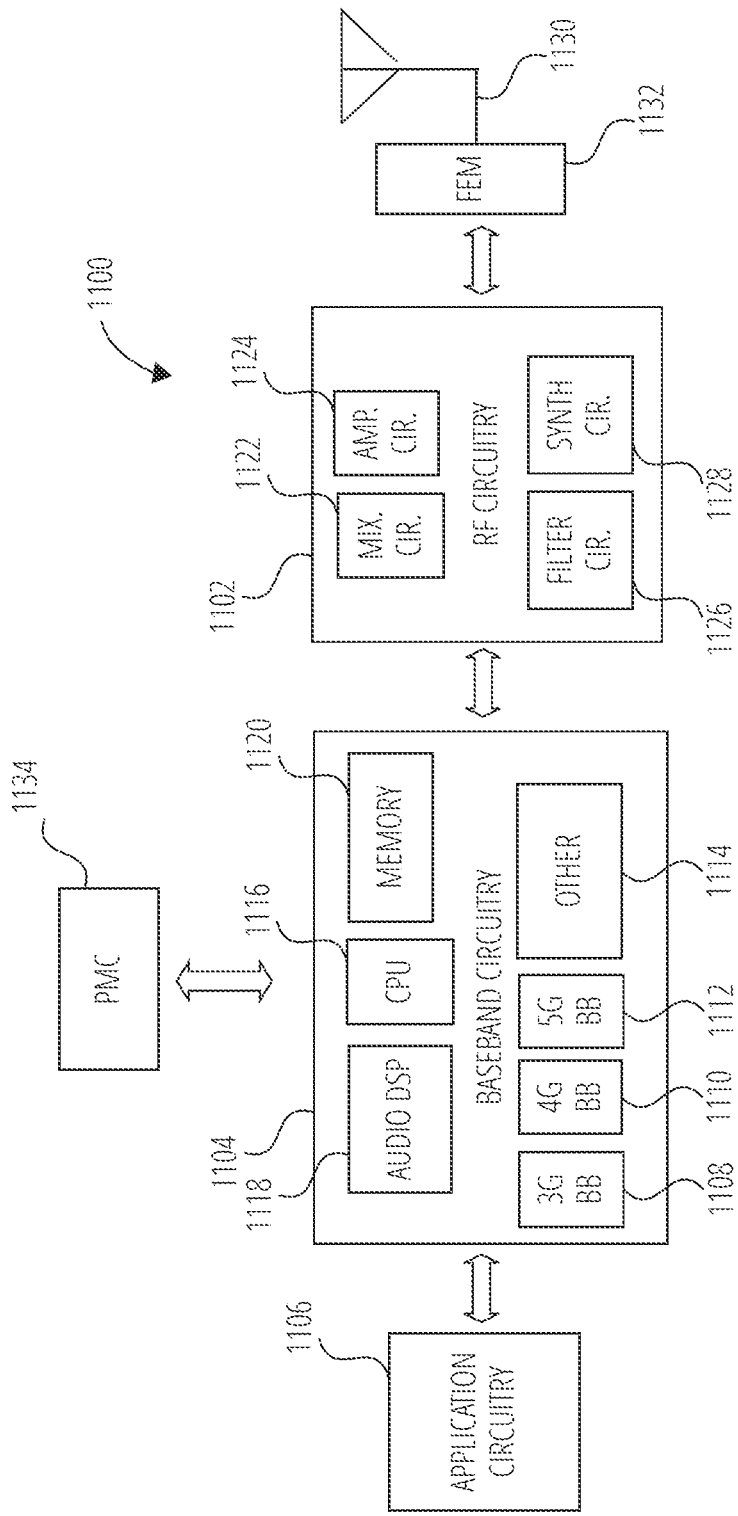
FIG. 11 is a block diagram showing components of baseband and RF circuitry.

FIG. 11 illustrates example components of a device 1100 in accordance with some embodiments. In some embodiments, the device 1100 may include application circuitry 1106, baseband circuitry 1104, Radio Frequency (RF) circuitry (shown as RF circuitry 1102), front-end module (FEM) circuitry (shown as FEM circuitry 1132), one or more antennas 1130, and power management circuitry (PMC) (shown as PMC 1134) coupled together at least as shown. The components of the illustrated device 1100 may be included in a UE or a RAN node. In some embodiments, the device 1100 may include fewer elements (e.g., a RAN node may not utilize application circuitry 1106, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1106 may include one or more application processors. For example, the application circuitry 1106 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1106 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1102 and to generate baseband signals for a transmit signal path of the RF circuitry 1102. The baseband circuitry 1104 may interface with the application circuitry 1106 for generation and processing of the baseband signals and for controlling operations of the RF circuitry 1102. For example, in some embodiments, the baseband circuitry 1104 may include a third generation (3G) baseband processor (3G baseband processor 1108), a fourth generation (4G) baseband processor (4G baseband processor 1110), a fifth generation (5G) baseband processor (5G baseband processor 1112), or other baseband processor(s) 1114 for other existing generations, generations in development or to be developed in the future (e.g., second generation (2G), sixth generation (6G), etc.). The baseband circuitry 1104 (e.g., one or more of baseband processors) may handle various radio control functions that enable communication with one or more radio networks via the RF circuitry 1102. In other embodiments, some or all of the functionality of the illustrated baseband processors may be included in modules stored in the memory 1120 and executed via a Central Processing Unit (CPU 1116). The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include a digital signal processor (DSP), such as one or more audio DSP(s) 1118. The one or more audio DSP(s) 1118 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1106 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 1104 is configured to support radio communications of more than one wireless protocol may be referred to as multi-mode baseband circuitry.

The RF circuitry 1102 may enable communication with wireless networks using modulated electromagnetic radiation through a non-solid medium. In various embodiments, the RF circuitry 1102 may include switches, filters, amplifiers, etc. to facilitate the communication with the wireless network. The RF circuitry 1102 may include a receive signal path which may include circuitry to down-convert RF signals received from the FEM circuitry 1132 and provide baseband signals to the baseband circuitry 1104. The RF circuitry 1102 may also include a transmit signal path which may include circuitry to up-convert baseband signals provided by the baseband circuitry 1104 and provide RF output signals to the FEM circuitry 1132 for transmission.

In some embodiments, the receive signal path of the RF circuitry 1102 may include mixer circuitry 1122, amplifier circuitry 1124 and filter circuitry 1126. In some embodiments, the transmit signal path of the RF circuitry 1102 may include filter circuitry 1126 and mixer circuitry 1122. The RF circuitry 1102 may also include synthesizer circuitry 1128 for synthesizing a frequency for use by the mixer circuitry 1122 of the receive signal path and the transmit signal path. In some embodiments, the mixer circuitry 1122 of the receive signal path may be configured to down-convert RF signals received from the FEM circuitry 1132 based on the synthesized frequency provided by synthesizer circuitry 1128. The amplifier circuitry 1124 may be configured to amplify the down-converted signals and the filter circuitry 1126 may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, the mixer circuitry 1122 of the receive signal path may comprise passive mixers, although the scope of the embodiments is not limited in this respect.

In some embodiments, the mixer circuitry 1122 of the transmit signal path may be configured to up-convert input baseband signals based on the synthesized frequency provided by the synthesizer circuitry 1128 to generate RF output signals for the FEM circuitry 1132. The baseband signals may be provided by the baseband circuitry 1104 and may be filtered by the filter circuitry 1126.

In some embodiments, the mixer circuitry 1122 of the receive signal path and the mixer circuitry 1122 of the transmit signal path may include two or more mixers and may be arranged for quadrature downconversion and upconversion, respectively. In some embodiments, the mixer circuitry 1122 of the receive signal path and the mixer circuitry 1122 of the transmit signal path may include two or more mixers and may be arranged for image rejection (e.g., Hartley image rejection). In some embodiments, the mixer circuitry 1122 of the receive signal path and the mixer circuitry 1122 may be arranged for direct downconversion and direct upconversion, respectively. In some embodiments, the mixer circuitry 1122 of the receive signal path and the mixer circuitry 1122 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1102 may include analog-to-digital converter (ADC) and digital-to-analog converter (DAC) circuitry and the baseband circuitry 1104 may include a digital baseband interface to communicate with the RF circuitry 1102.

In some dual-mode embodiments, a separate radio IC circuitry may be provided for processing signals for each spectrum, although the scope of the embodiments is not limited in this respect.

In some embodiments, the synthesizer circuitry 1128 may be a fractional-N synthesizer or a fractional N/N+1 synthesizer, although the scope of the embodiments is not limited in this respect as other types of frequency synthesizers may be suitable. For example, synthesizer circuitry 1128 may be a delta-sigma synthesizer, a frequency multiplier, or a synthesizer comprising a phase-locked loop with a frequency divider.

The synthesizer circuitry 1128 may be configured to synthesize an output frequency for use by the mixer circuitry 1122 of the RF circuitry 1102 based on a frequency input and a divider control input. In some embodiments, the synthesizer circuitry 1128 may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1106 (such as an applications processor) depending on the desired output frequency. In some embodiments, a divider control input (e.g., N) may be determined from a look-up table based on a channel indicated by the application circuitry 1106.

Synthesizer circuitry 1128 of the RF circuitry 1102 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1128 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1102 may include an IQ/polar converter.

The FEM circuitry 1132 may include a receive signal path which may include circuitry configured to operate on RF signals received from one or more antennas 1130, amplify the received signals and provide the amplified versions of the received signals to the RF circuitry 1102 for further processing. The FEM circuitry 1132 may also include a transmit signal path which may include circuitry configured to amplify signals for transmission provided by the RF circuitry 1102 for transmission by one or more of the one or more antennas 1130. In various embodiments, the amplification through the transmit or receive signal paths may be done solely in the RF circuitry 1102, solely in the FEM circuitry 1132, or in both the RF circuitry 1102 and the FEM circuitry 1132.

In some embodiments, the FEM circuitry 1132 may include a TX/RX switch to switch between transmit mode and receive mode operation. The FEM circuitry 1132 may include a receive signal path and a transmit signal path. The receive signal path of the FEM circuitry 1132 may include an LNA to amplify received RF signals and provide the amplified received RF signals as an output (e.g., to the RF circuitry 1102). The transmit signal path of the FEM circuitry 1132 may include a power amplifier (PA) to amplify input RF signals (e.g., provided by the RF circuitry 1102), and one or more filters to generate RF signals for subsequent transmission (e.g., by one or more of the one or more antennas 1130).

In some embodiments, the PMC 1134 may manage power provided to the baseband circuitry 1104. In particular, the PMC 1134 may control power-source selection, voltage scaling, battery charging, or DC-to-DC conversion. The PMC 1134 may often be included when the device 1100 is capable of being powered by a battery, for example, when the device 1100 is included in a UE. The PMC 1134 may increase the power conversion efficiency while providing desirable implementation size and heat dissipation characteristics.

FIG. 11 shows the PMC 1134 coupled only with the baseband circuitry 1104. However, in other embodiments, the PMC 1134 may be additionally or alternatively coupled with, and perform similar power management operations for, other components such as, but not limited to, the application circuitry 1106, the RF circuitry 1102, or the FEM circuitry 1132.

In some embodiments, the PMC 1134 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1106 and processors of the baseband circuitry 1104 may be used to execute elements of one or more instances of a protocol stack. For example, processors of the baseband circuitry 1104, alone or in combination, may be used to execute Layer 3, Layer 2, or Layer 1 functionality, while processors of the application circuitry 1106 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
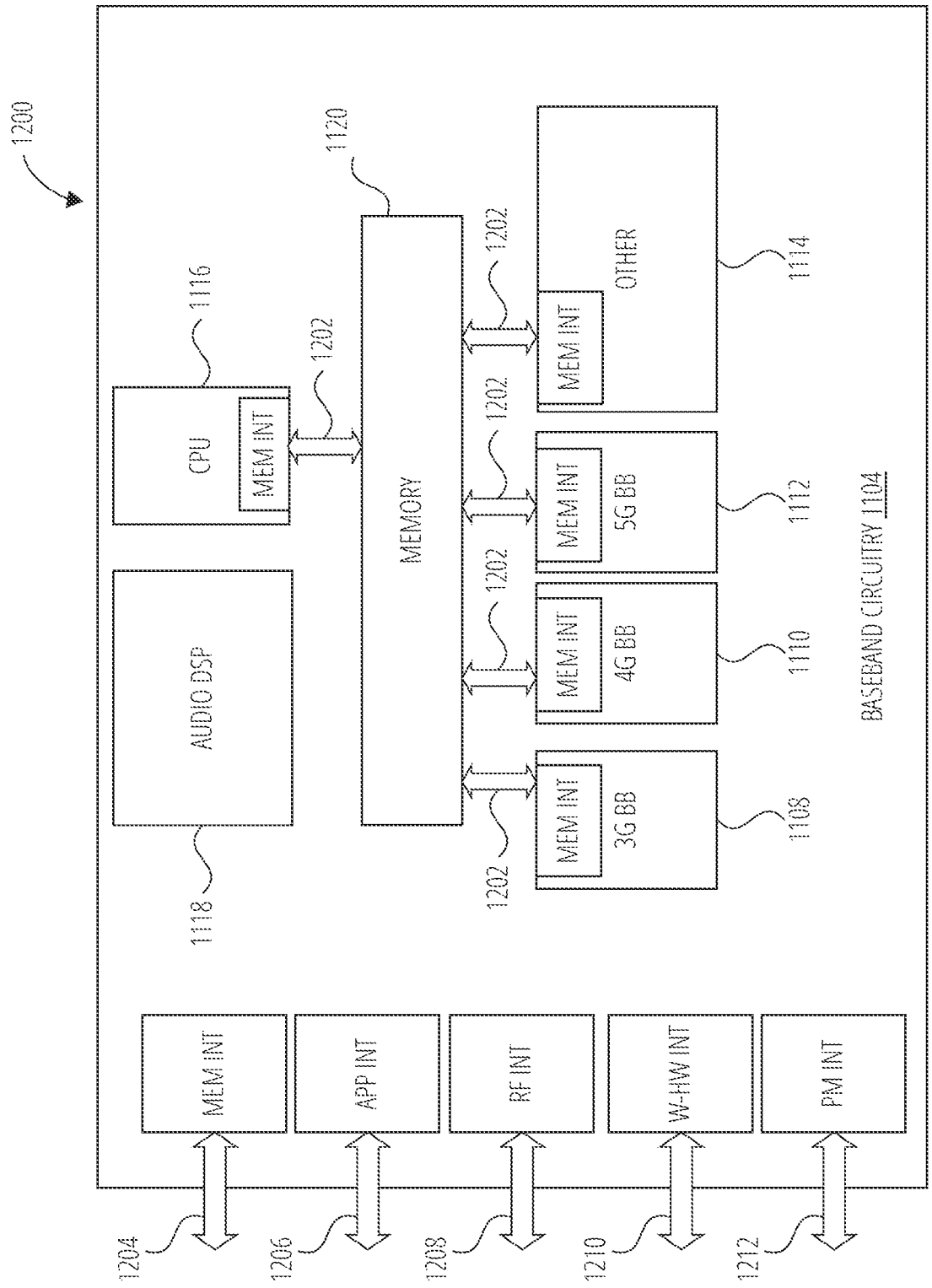
FIG. 12 is a block diagram showing interfaces of baseband circuitry.

FIG. 12 illustrates example interfaces 1200 of baseband circuitry in accordance with some embodiments. As discussed above, the baseband circuitry 1104 of FIG. 11 may comprise 3G baseband processor 1108, 4G baseband processor 1110, 5G baseband processor 1112, other baseband processor(s) 1114, CPU 1116, and a memory 1120 utilized by said processors. As illustrated, each of the processors may include a respective memory interface 1202 to send/receive data to/from the memory 1120.

The baseband circuitry 1104 may further include one or more interfaces to communicatively couple to other circuitries/devices, such as a memory interface 1204 (e.g., an interface to send/receive data to/from memory external to the baseband circuitry 1104), an application circuitry interface 1206 (e.g., an interface to send/receive data to/from the application circuitry 1106 of FIG. 11), an RF circuitry interface 1208 (e.g., an interface to send/receive data to/from RF circuitry 1102 of FIG. 11), a wireless hardware connectivity interface 1210 (e.g., an interface to send/receive data to/from Near Field Communication (NFC) components, Bluetooth® components (e.g., Bluetooth® Low Energy), Wi-Fi® components, and other communication components), and a power management interface 1212 (e.g., an interface to send/receive power or control signals to/from the PMC 1134.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1: a method, performed by a user equipment (UE) for a 5G network, of configuring the UE to perform a measurement during a network controlled small gap (NCSG), the NCSG including a first visible interruption length (VIL1), a measurement length (ML), a second visible interruption length (VIL2), and a visible interruption repetition period (VIRP), the method comprising: transmitting to the 5G network a UE capability indicating a length of one or both the VIL1 and the VIL2; and receiving NCSG pattern information indicating the NCSG, in which the VIL1 and the VIL2 indicate when the UE is not expected to transmit and receive data on a serving carrier, the ML indicates when the UE is expected to transmit and receive data on the serving carrier, and the VIRP indicates a period in which to repeat the NCSG.

Example 2. The method of example 1, in which the NCSG is configured per carrier.

Example 3. The method of example 1, in which the NCSG is configured per UE.

Example 4. The method of example 1, in which the NCSG is configured per frequency range.

Example 5. The method of example 1, in which the NCSG is configured per bandwidth part (BWP).

Example 6. The method of example 1, in which the NCSG is configured per band, or per band combination.

Example 7. The method of example 1, in which the NCSG is configured per feature set.

Example 8. The method of example 1, in which the NCSG is configured on a carrier or bandwidth part for which there is no other configured measurement gap.

Example 9. The method of example 1, in which the NCSG is configured on a carrier or bandwidth part for which there is a legacy measurement gap.

Example 10. The method of example 1, in which the VIL1 is configured to interrupt two slots in an asynchronous configuration.

Example 11. The method of example 1, in which the UE capability is indicated in an SRS-SwitchingTimeNR information element.

Example 12. The method of example 1, in which the VIL1 and VIL2 include a minimum number of symbols.

Example 13. The method of example 1, in which the VIRP includes a set of periods matching those of Measurement Gap Repetition Periods (MGRP).

Example 14. A non-transitory computer-readable storage medium of a user equipment (UE) for a 5G network, the computer-readable storage medium including instructions for configuring the UE to perform a measurement during a network controlled small gap (NCSG), the NCSG including a first visible interruption length (VIL1), a measurement length (ML), a second visible interruption length (VIL2), and a visible interruption repetition period (VIRP), the instructions, when executed by UE, cause the UE to: transmit to the 5G network a UE capability indicating a length of one or both the VIL1 and the VIL2; and receive NCSG pattern information indicating the NCSG, in which the VIL1 and the VIL2 indicate when the UE is not expected to transmit and receive data on a serving carrier, the ML indicates when the UE is expected to transmit and receive data on the serving carrier, and the VIRP indicates a period in which to repeat the NCSG.

Example 15. The computer-readable storage medium of example 14, in which the NCSG is configured per carrier.

Example 16. The computer-readable storage medium of example 14, in which the NCSG is configured per UE.

Example 17. The computer-readable storage medium of example 14, in which the NCSG is configured per frequency range.

Example 18. The computer-readable storage medium of example 14, in which the NCSG is configured per bandwidth part (BWP).

Example 19. The computer-readable storage medium of example 14, in which the NCSG is configured per band, or per band combination.

Example 20. The computer-readable storage medium of example 14, in which the NCSG is configured per feature set.

Example 21. The computer-readable storage medium of example 14, in which the NCSG is configured on a carrier or bandwidth part for which there is no other configured measurement gap.

Example 22. The computer-readable storage medium of example 14, in which the NCSG is configured on a carrier or bandwidth part for which there is a legacy measurement gap.

Example 23. The computer-readable storage medium of example 14, in which the VIL1 is configured to interrupt two slots in an asynchronous configuration.

Example 24. The computer-readable storage medium of example 14, in which the UE capability is indicated in an SRS-SwitchingTimeNR information element.

Example 25. The computer-readable storage medium of example 14, in which the VIL1 and VIL2 include a minimum number of symbols.

Example 26. The computer-readable storage medium of example 14, in which the VIRP includes a set of periods match those of Measurement Gap Repetition Periods (MGRP).

Example 27 may include an apparatus comprising means to perform one or more elements of a method described in or related to any of the above Examples, or any other method or process described herein.

Example 28 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 29 may include an apparatus comprising logic, modules, or circuitry to perform one or more elements of a method described in or related to any of the above Examples, or any other method or process described herein.

Example 30 may include a method, technique, or process as described in or related to any of the above Examples, or portions or parts thereof.

Example 31 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 32 may include a signal as described in or related to any of the above Examples, or portions or parts thereof.

Example 33 may include a datagram, packet, frame, segment, protocol data unit (PDU), or message as described in or related to any of the above Examples, or portions or parts thereof, or otherwise described in the present disclosure.

Example 34 may include a signal encoded with data as described in or related to any of the above Examples, or portions or parts thereof, or otherwise described in the present disclosure.

Example 35 may include a signal encoded with a datagram, packet, frame, segment, PDU, or message as described in or related to any of the above Examples, or portions or parts thereof, or otherwise described in the present disclosure.

Example 36 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 37 may include a computer program comprising instructions, wherein execution of the program by a processing element is to cause the processing element to carry out the method, techniques, or process as described in or related to any of the above Examples, or portions thereof.

Example 38 may include a signal in a wireless network as shown and described herein.

Example 39 may include a method of communicating in a wireless network as shown and described herein.

Example 40 may include a system for providing wireless communication as shown and described herein.

Example 41 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a user equipment (UE) for a 5G network, of configuring the UE to perform a measurement during a network controlled small gap (NCSG), the NCSG including a first visible interruption length (VIL1), a measurement length (ML), a second visible interruption length (VIL2), and a visible interruption repetition period (VIRP), the method comprising:
   transmitting to the 5G network a UE capability indicating a length of one or both the VIL1 and the VIL2, wherein the UE capability is indicated in an SRS-SwitchingTimeNR information element; and
   receiving NCSG pattern information indicating the NCSG, in which the VIL1 and the VIL2 indicate when the UE is not expected to transmit and receive data on a serving carrier, the ML indicates when the UE is expected to transmit and receive data on the serving carrier, and the VIRP indicates a period in which to repeat the NCSG, wherein the VIRP includes a set of periods matching those of Measurement Gap Repetition Periods (MGRP).

2. The method of claim 1, in which the NCSG is configured per carrier.

3. The method of claim 1, in which the NCSG is configured per UE.

4. The method of claim 1, in which the NCSG is configured per frequency range.

5. The method of claim 1, in which the NCSG is configured per bandwidth part (BWP).

6. The method of claim 1, in which the NCSG is configured per band, or per band combination.

7. The method of claim 1, in which the NCSG is configured per feature set.

8. The method of claim 1, in which the NCSG is configured on a carrier or bandwidth part for which there is no other configured measurement gap.

9. The method of claim 1, in which the NCSG is configured on a carrier or bandwidth part for which there is a legacy measurement gap.

10. The method of claim 1, in which the VIL1 is configured to interrupt two slots in an asynchronous configuration.

11. The method of claim 1, in which the VIL1 and VIL2 include a minimum number of symbols.

12. A non-transitory computer-readable storage medium of a user equipment (UE) for a 5G network, the computer-readable storage medium including instructions for configuring the UE to perform a measurement during a network controlled small gap (NCSG), the NCSG including a first visible interruption length (VIL1), a measurement length (ML), a second visible interruption length (VIL2), and a visible interruption repetition period (VIRP), the instructions, when executed by UE, cause the UE to:

transmit to the 5G network a UE capability indicating a length of one or both the VIL1 and the VIL2, wherein the UE capability is indicated in an SRS-SwitchingTimeNR information element; and receive NCSG pattern information indicating the NCSG, in which the VIL1 and the VIL2 indicate when the UE is not expected to transmit and receive data on a serving carrier, the ML indicates when the UE is expected to transmit and receive data on the serving carrier, and the VIRP indicates a period in which to repeat the NCSG, wherein the VIRP includes a set of periods matching those of Measurement Gap Repetition Periods (MGRP).

13. The computer-readable storage medium of claim 12, in which the NCSG is configured per carrier.

14. The computer-readable storage medium of claim 12, in which the NCSG is configured per UE.

15. The computer-readable storage medium of claim 12, in which the NCSG is configured per frequency range.

16. The computer-readable storage medium of claim 12, in which the NCSG is configured per bandwidth part (BWP).

17. The computer-readable storage medium of claim 12, in which the NCSG is configured per band, or per band combination.

18. The computer-readable storage medium of claim 12, in which the NCSG is configured per feature set.

* * * * *